UNITED STATES PATENT OFFICE.

SAMUEL RODGERS, OF SAN FRANCISCO, CALIFORNIA, ASSIGNOR TO THE UNITED STATES SMOKELESS POWDER COMPANY, OF SAME PLACE.

EXPLOSIVE COMPOUND.

SPECIFICATION forming part of Letters Patent No. 478,366, dated July 5, 1892.

Application filed August 25, 1891. Serial No. 403,717. (No specimens.)

*To all whom it may concern:*

Be it known that I, SAMUEL RODGERS, a citizen of the United States, residing at San Francisco, San Francisco county, State of California, have invented an Improvement in Explosive Compounds; and I hereby declare the following to be a full, clear, and exact description of the same.

My invention relates to an improved explosive compound; and it consists of the combination of certain substances in the manner and proportion as hereinafter described. In the preparation of my compound I use picrate of ammonia, nitrate of ammonia, and nitro-glycerine. Of these materials I take four parts of picrate of ammonia, six parts of nitrate of ammonia, and six parts of nitro-glycerine. The picrate and nitrate of ammonia are first intimately mixed together in any suitable mixing apparatus, and after this has been accomplished the nitro-glycerine is added all at once. The mixture is then stirred or agitated by wooden spatulas or by any suitable mixing apparatus which will agitate and mix the ingredients properly. When thoroughly mixed the compound will have about the consistence of moist Indian meal and will be in readiness for use. The proportions which I have hereinabove given of these materials may be varied, as will be manifest to any one familiar with the art, for the purpose of producing explosives of greater or less strength, as may be desired.

Having thus described my invention, what I claim as new, and desire to protect by Letters Patent, is—

A compound consisting of picrate of ammonia, nitrate of ammonia, and nitro-glycerine mixed in proportions substantially as herein described.

In witness whereof I have hereunto set my hand.

SAMUEL RODGERS.

Witnesses:
    S. H. NOURSE,
    J. A. BAYLESS.